(12) United States Patent
Luo et al.

(10) Patent No.: US 6,414,817 B1
(45) Date of Patent: Jul. 2, 2002

(54) HIGH FRICTION DISC SUPPORT MEMBER TO INCREASE DISC DRIVE MECHANICAL SHOCK RESISTANCE

(75) Inventors: Erming Luo, Norman; Mathew Daniel, Oklahoma City, both of OK (US); Xiong Liu, Singapore (SG); John D. Stricklin, Oklahoma City; Nigel F. Misso, Bethany, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/510,745

(22) Filed: Feb. 22, 2000

Related U.S. Application Data

(60) Provisional application No. 60/121,735, filed on Feb. 26, 1999, provisional application No. 60/122,017, filed on Feb. 26, 1999, provisional application No. 60/121,167, filed on Feb. 22, 1999, and provisional application No. 60/121,027, filed on Feb. 22, 1999.

(51) Int. Cl.[7] .............................................. G11B 17/02
(52) U.S. Cl. .................................................... 360/98.08
(58) Field of Search ........................... 360/97.01, 98.01, 360/98.08, 99.12

(56) References Cited

U.S. PATENT DOCUMENTS

| | | | |
|---|---|---|---|
| 4,754,351 A | 6/1988 | Wright | 360/98.08 |
| 4,819,105 A | 4/1989 | Edwards | 360/98.08 |
| 4,945,432 A | 7/1990 | Matsudaira et al. | 360/98.02 |
| 5,006,942 A | 4/1991 | Brooks et al. | 360/98.08 |
| 5,031,062 A | 7/1991 | Wood et al. | 360/98.08 |
| 5,208,712 A * | 5/1993 | Hatch et al. | 360/98.01 |
| 5,272,581 A | 12/1993 | Kojima et al. | 360/98.01 |
| 5,274,517 A | 12/1993 | Chen | 360/98.08 |
| 5,295,030 A | 3/1994 | Tafreshi | 360/99.12 |
| 5,333,080 A | 7/1994 | Ridinger et al. | 360/99.12 |
| 5,452,157 A | 9/1995 | Chow et al. | 360/98.08 |
| 5,504,638 A | 4/1996 | Kinoshita et al. | 360/98.08 |
| 5,517,376 A | 5/1996 | Green | 360/98.08 |
| 5,528,434 A | 6/1996 | Bronshvatch et al. | 360/98.08 |
| 5,596,462 A | 1/1997 | Smith | 360/99.12 |
| 5,600,512 A | 2/1997 | Radwam et al. | 360/98.08 |
| 5,636,084 A | 6/1997 | Ishizuka | 360/99.08 |
| 5,663,851 A | 9/1997 | Jeong et al. | 360/98.08 |
| 5,701,219 A | 12/1997 | Shafe' | 360/105 |
| 5,781,374 A | 7/1998 | Moir et al. | 360/99.12 |
| 5,875,171 A | 2/1999 | Albrecht et al. | 360/98.08 |
| 6,055,123 A * | 4/2000 | Kazmierczak et al. | 360/98.08 |
| 6,064,547 A * | 5/2000 | Wittig et al. | 360/98.08 |
| 6,172,844 B1 * | 1/2001 | Luo et al. | 360/98.08 |
| 6,201,661 B1 * | 3/2001 | Korkowski | 360/98.08 |
| 6,208,486 B1 * | 3/2001 | Gustafson et al. | 360/98.08 |
| 6,255,750 B1 * | 7/2001 | Mohajerani et al. | 310/51 |

FOREIGN PATENT DOCUMENTS

JP        2000-57740        * 2/2000

* cited by examiner

Primary Examiner—Jefferson Evans
(74) Attorney, Agent, or Firm—Crowe & Dunlevy

(57) ABSTRACT

Apparatus in a disc drive for improving resistance of a disc drive disc stack to radially directed mechanical shocks. A disc is disposed about a rotatable spindle motor hub. Opposing first and second disc support members (such as a disc clamp, disc spacers, or a hub flange) circumferentially extend about the outer hub surface and cooperate to apply a clamping force to the disc to secure the disc relative to the spindle motor hub. The disc support members each comprise a circumferentially extending ring of high friction material having a contact surface that axially extends toward the disc. The clamping force applied to the disc is localized at the rings and at nodes extending from the disc support members so that respective gaps are formed between the disc and remaining portions of the disc support members, thereby reducing radial disc slip, increasing disc dampening, and reducing the likelihood of disc coning and warping.

15 Claims, 4 Drawing Sheets

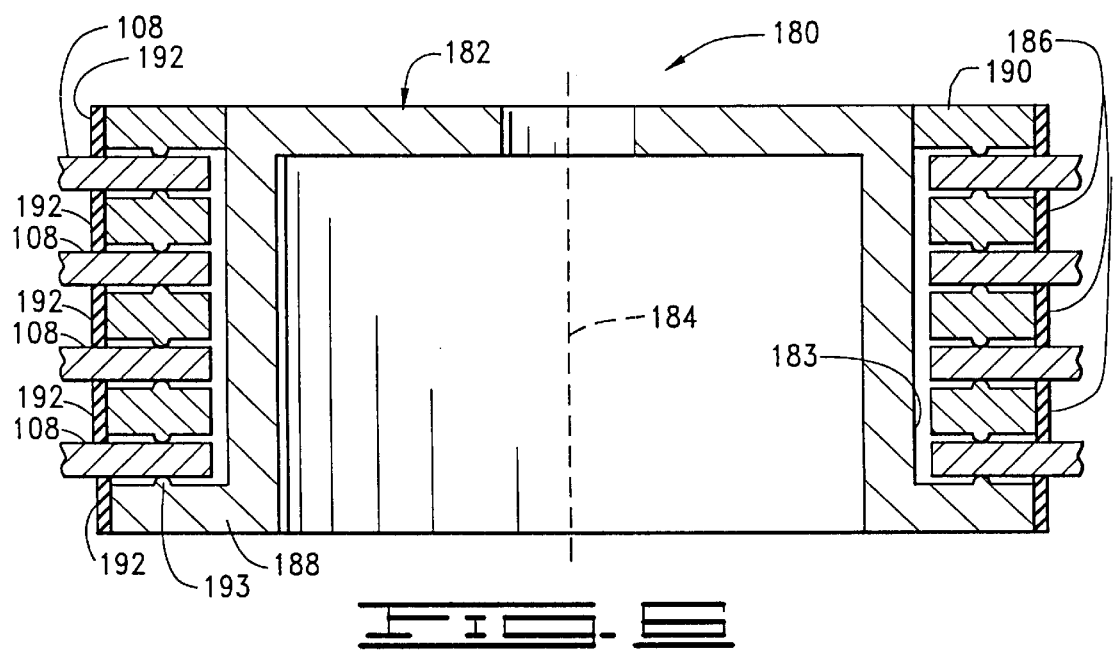
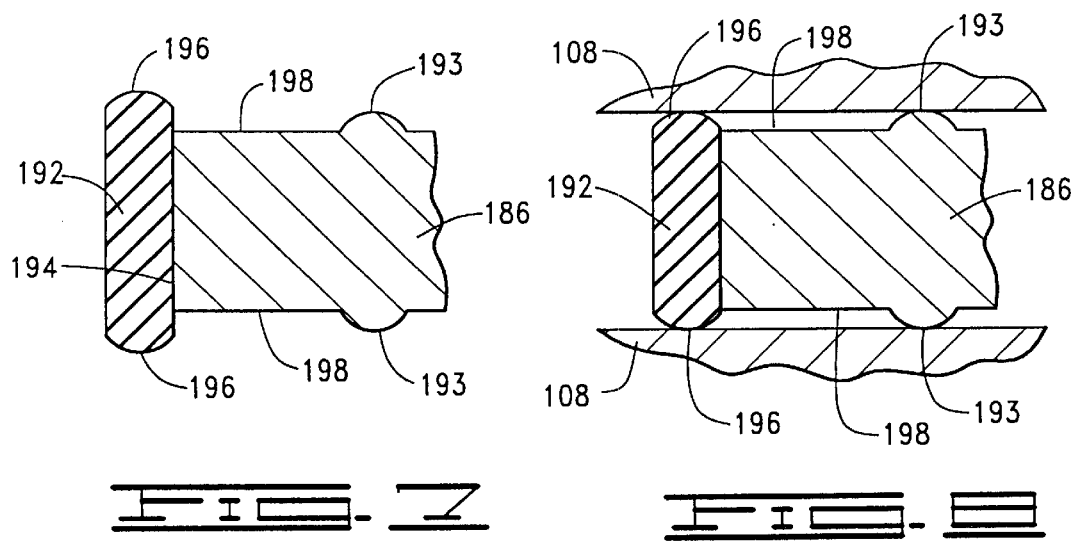

HIGH FRICTION DISC SUPPORT MEMBER TO INCREASE DISC DRIVE MECHANICAL SHOCK RESISTANCE

RELATED APPLICATIONS

This application claims priority to the following U.S. Provisional Applications: No. 60/121,027 filed Feb. 22, 1999; No. 60/121,167 filed Feb. 22, 1999; No. 60/122,017 filed Feb. 26, 1999; and No. 60/121,735 filed Feb. 26, 1999.

FIELD OF THE INVENTION

This invention relates generally to the field of magnetic data storage devices, and more particularly, but not by way of limitation, to improving mechanical shock performance through the use of rings of high friction material in disc support members used to mount a rotatable disc to a spindle motor.

BACKGROUND

Disc drives are used as primary data storage devices in modem computer systems and networks. A typical disc drive comprises one or more rigid magnetic storage discs which are journaled about a spindle motor for rotation at a constant high speed. An array of read/write transducing heads are provided to transfer data between tracks of the discs and a host computer in which the disc drive is mounted. The heads are mounted to a rotary actuator assembly and are controllably positioned adjacent the tracks by a closed loop servo system.

As disc drives become smaller and store greater amounts of data, reliability problems can increasingly arise from the application of mechanical shocks to the drives. Such shocks, if sufficiently severe, can cause a shift in the discs relative to the rotatable hubs of the spindle motor supporting the discs, inducing eccentricities in the tracks sufficient to prevent the drives from retrieving previously stored data.

Increasing the clamping force used to secure the discs to the hub can increase resistance to mechanical shocks, but too much clamping force can undesirably induce warping of the discs. Thus, various prior art approaches to reducing disc slip have included using "teeth" to interlock the discs and adjacent disc spacers as taught by U.S. Pat. No. 5,596,462 to Smith and U.S. Pat. No. 5,875,171 to Albrecht et al.; using a coating of higher friction elastomeric material between each adjacent disc and spacer as taught by U.S. Pat. Nos. 4,945,432 and 5,031,062; and using compressible o-rings in grooves formed in spacers as taught by U.S. Pat. Nos. 5,272,581 and 5,636,084.

While operable, there remains a continued need for improvements in the art to increase the resistance to disc slip as a result of mechanical shocks.

SUMMARY OF THE INVENTION

The present invention is directed to an apparatus for improving resistance of a disc drive disc stack to radially directed mechanical shocks.

In accordance with preferred embodiments, a disc drive includes a spindle motor hub which is configured for rotation about a central axis and has a circumferentially extending outer hub surface. A disc circumferentially extends about the outer hub surface and has top and bottom disc surfaces each extending along planes substantially normal to the central axis, with the disc having a disc coefficient of friction.

Opposing first and second disc support members (such as a disc clamp, disc spacers or a hub flange) circumferentially extend about the outer hub surface and cooperate to apply a clamping force to the disc to secure the disc relative to the spindle motor hub. The first and second disc support members each comprise a radially extending support member surface immediately adjacent the disc along a plane substantially normal to the central axis and a circumferentially extending ring having a contact surface that axially extends from the radially extending support member surface toward the disc. Each ring has a coefficient of friction greater than the disc coefficient of friction.

Each support member further comprises a circumferentially extending node that axially extends from the radially extending support surface toward the disc. The clamping force applied to the top and bottom disc surfaces is localized by the contact surfaces of the rings and the circumferentially extending node so that respective gaps are formed between the top and bottom disc surfaces and the radially extending support member surfaces. This reduces the likelihood of disc coning or warping.

By increasing the coefficient of friction at the boundaries securing the discs, smaller normal clamping forces can be used to achieve the same levels of radial shock resistance. Conversely, the same levels of normal clamping force can be applied to achieve greater levels of radial shock resistance. Moreover, the rings improve the mechanical coupling of the discs to the spindle hub, thereby reducing disc ringing in response to axially and radially directed mechanical shocks.

These and various other features and advantages which characterize the present invention will be apparent from a reading of the following detailed description and a review of the associated drawings.

BRIEF DESCRIPTION OF THE DRAWINGS

FIG. 6 is an elevational, cross-sectional view of a disc stack assembly that uses rings of high friction coefficient material to increase mechanical shock resistance in accordance with another preferred embodiment of the present invention.

FIG. 7 shows a cross-sectional view of one of the rings of FIG. 6 in an unloaded state.

FIG. 8 shows a cross-sectional view of the ring of FIG. 7 in a loaded state.

DETAILED DESCRIPTION

Figure 1:
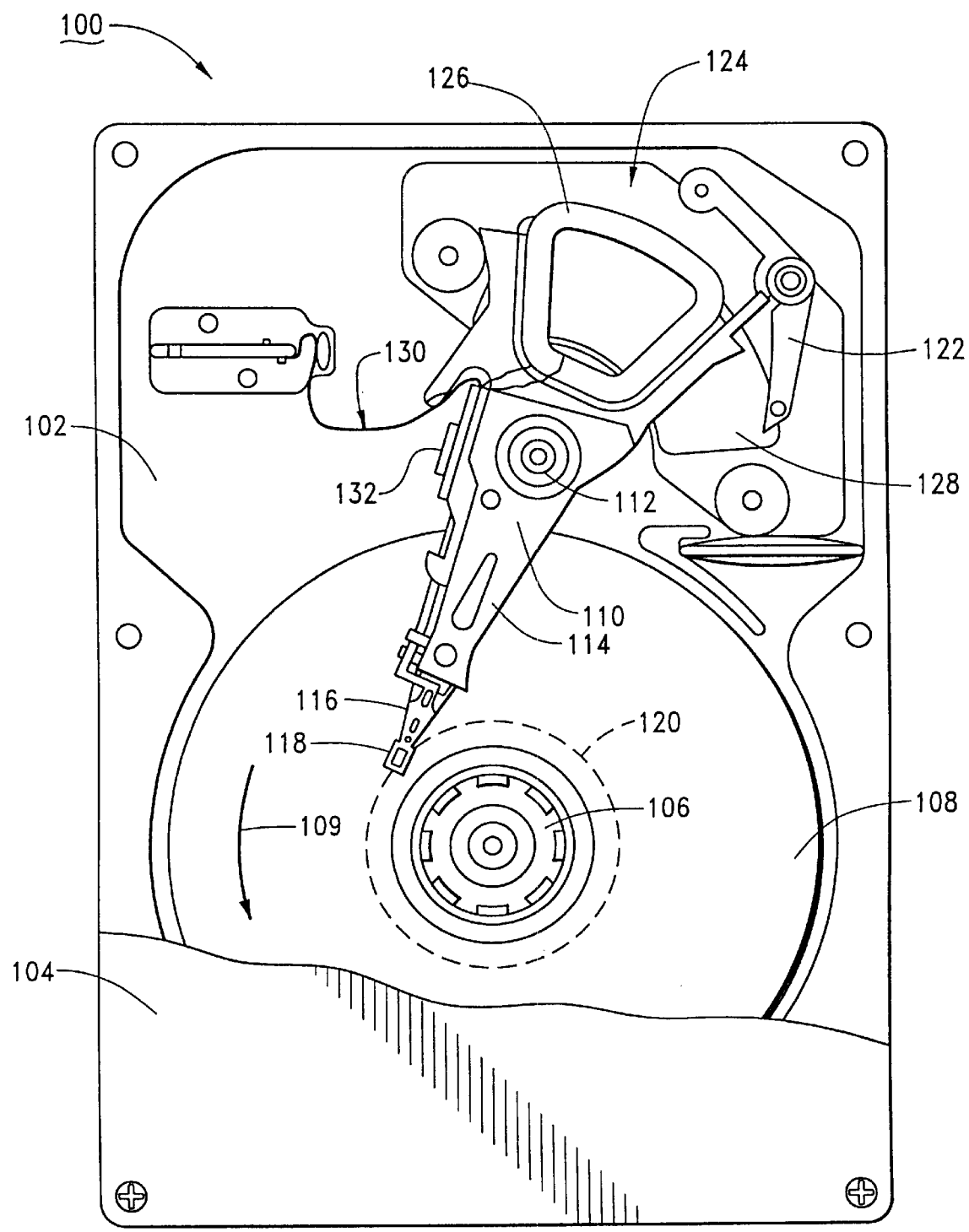
FIG. 1 is a top plan view of a disc drive in which preferred embodiments of the present invention can be advantageously practiced.

Referring to FIG. 1, shown therein is a top plan view of a disc drive 100 used to store computerized data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor 106 rotates a plurality of magnetic recording discs 108 at a constant high speed (in thousands of revolutions per minute) in an angular direction denoted by arrow 109. User data are written to and read from tracks (not designated) on the discs 108 through the use of an actuator assembly 110,which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102. The flex assembly 130 includes a preamplifier/driver circuit 132 that interfaces with the heads 118.

Figure 2:
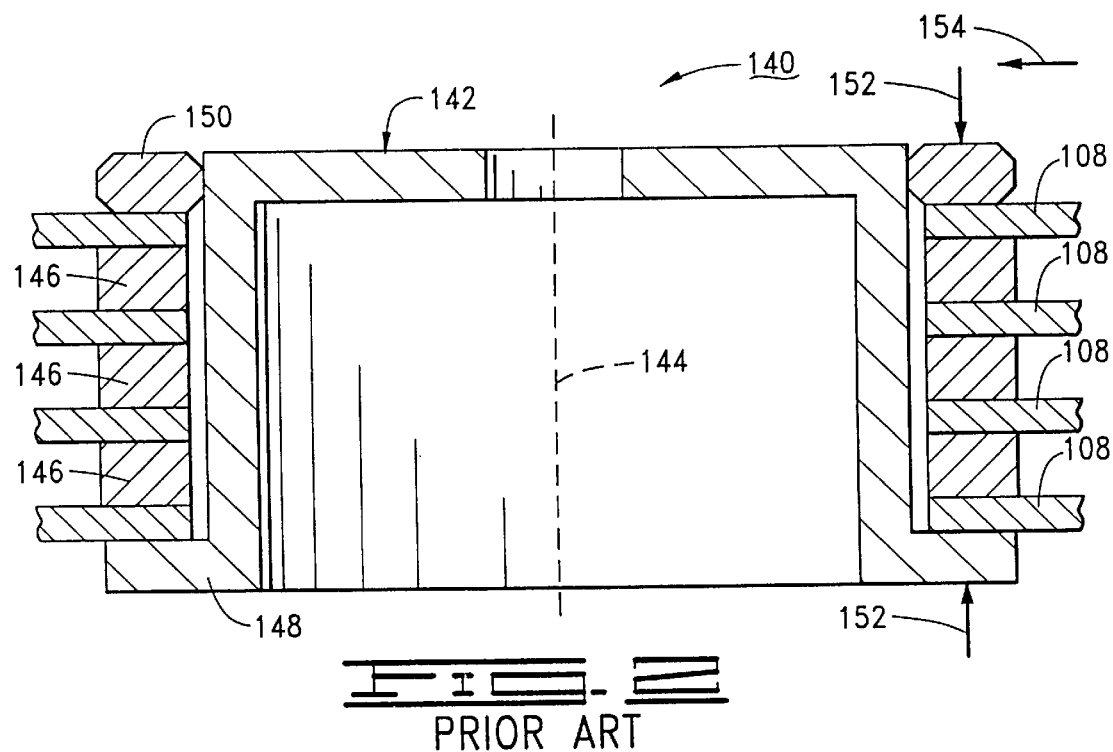
FIG. 2 is an elevational, cross-sectional view of a prior art disc stack assembly.

FIG. 2 provides an elevational, cross-sectional view of a prior art disc stack 140 affixed for rotation by a spindle motor hub 142 about an axis 144. A plurality of discs 108 (nominally identical to the discs of FIG. 1) and disc spacers 146 are alternatingly arranged on the hub 142 between a hub flange 148 and a clamp 150. The clamp 150 is a "shrink-fit" clamp with an inner diameter that is nominally smaller than the outer diameter of the hub 142. Assembly is accomplished by heating the clamp 150 so that thermal expansion allows the clamp 150 to fit over the hub 142. A desired magnitude of axial loading is applied to the disc clamp 150 while the clamp 150 is allowed to cool and form an interference fit with the hub 142. Other known types of clamps, such as spring clamps, operate in a similar manner to apply axially directed disc stack loading.

The axial clamping forces applied by the clamp 150 and the flange 148 are schematically illustrated by vectors 152. It will be noted that the selected material and geometry of the clamp 150 will generally determine the maximum amount of axial clamping force that can be exerted by the clamp, which in turn will generally determine the extent to which the disc stack 140 can resist disc slip.

By way of illustration, a radially directed mechanical shock $F_S$ applied to the disc stack (such as in the direction of vector 154), if greater than the resistive force established by the disc clamp 150 and the disc support flange 148, will tend to undesirably shift the entire set of discs 108 and disc spacers 146 in a direction toward the central axis 144. This will tend to introduce eccentricities in the tracks defined on the disc surfaces and may detrimentally affect (or prevent) recovery of previously stored data. The magnitude of the radially directed shock force $F_S$ can be described as:

$$F_S = m_{DS} a_S \quad (1)$$

where $m_{DS}$ represents the combined mass of the discs 108 and spacers 146 and $a_S$ represents the acceleration of the radially directed shock force (such as, for example, 200 g). The normal force $F_N$ exerted by the disc clamp 150 necessary to resist a resulting shift in the discs 108 and spacers 146 can be described as:

$$F_N = \frac{F_S}{\mu} \quad (2)$$

where $\mu$ represents the coefficient of friction between the clamp 150 and the top disc 108 and between the flange 148 and the bottom disc 108 (such as, for example, $\mu$=0.15+0.15=0.3 for the aluminum discs 108, spacers 146, flange 148 and clamp 150 of FIG. 2).

Using a total mass of 0.17 kilograms (corresponding to 0.37 pounds, lbs) for the discs 108 and spacers 146 of FIG. 2, a nominal clamping force $F_N$ of about 1000 newtons (about 225 lbs-force) would be required to resist a 200 g radially directed mechanical shock.

To meet greater levels of mechanical shock resistance, such as 500 g, it would seem that all would be required would be to merely increase the clamping force exerted by the clamp 150. However, there is an upper limit to the amount of clamping force that can be imparted by the clamp before damage is imparted to the disc stack. For example, it has been found that using a clamping force of about 1100 newtons (about 250 lbs-force) can distort or even structurally damage the discs 108.

Accordingly, the present invention provides a disc stack that incorporates rings of high friction material, such as a suitable rubber or plastic, to increase mechanical shock resistance over that provided by the prior art stack 140 of FIG. 2. By increasing the coefficient of friction at the boundaries securing the discs, smaller normal clamping forces can be used to achieve the same levels of radial shock resistance. Conversely, the same levels of normal clamping force can be applied to achieve greater levels of radial shock resistance.

Figure 3:
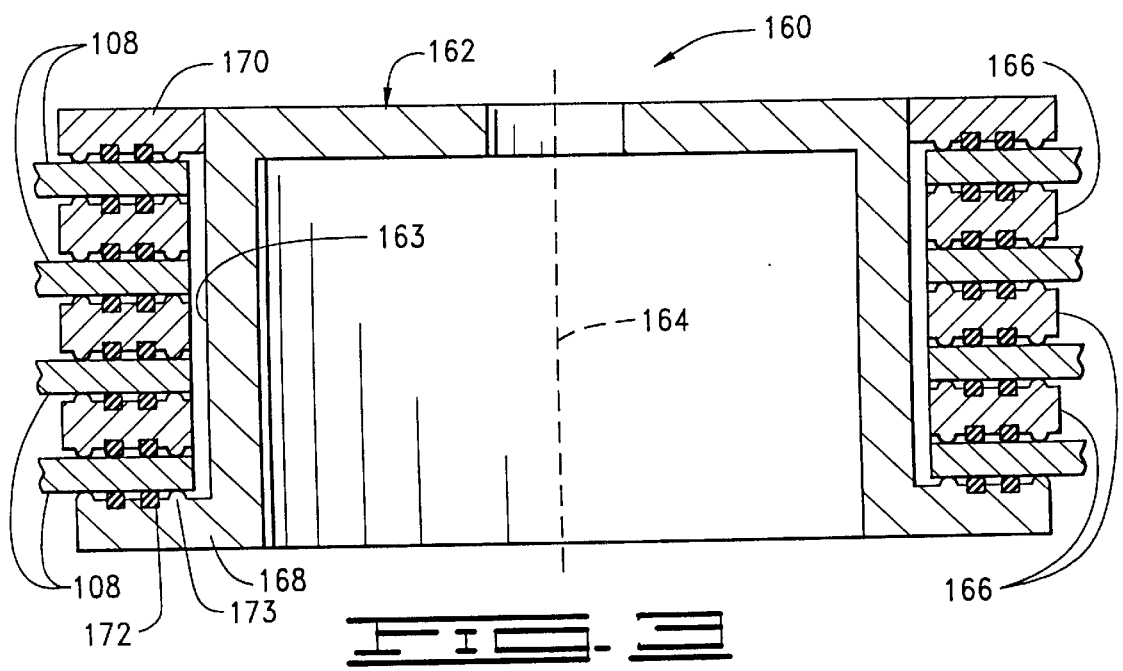
FIG. 3 is an elevational, cross-sectional view of a disc stack assembly that uses rings of high friction coefficient material to increase mechanical shock resistance in accordance with a preferred embodiment of the present invention.

A first embodiment is set forth by FIG. 3, which provides a disc stack 160 affixed about a spindle motor hub 162. The hub 162 has an outer surface 163 and rotates about a central axis 164. A plurality of discs 108 and spacers 166 are secured between a hub flange 168 and a shrink-fit clamp 170. The spacers 166, flange 168 and clamp 170 each include a plurality of rings (one of which is denoted at 172) of high friction material that localize the axially directed clamping forces between the clamp 170 and the flange 168. A suitable material for the rings is sorbothane, having a friction coefficient of 4.1 to 15.8 depending upon durometer. The spacers 166, flange 168 and clamp 170 each further include a plurality of circumferentially extending nodes (one of which is shown at 173). It will be understood that the axial extent of the rings 172 and nodes 173 can be selected as desired and have been exaggerated for clarity.

Figure 4:
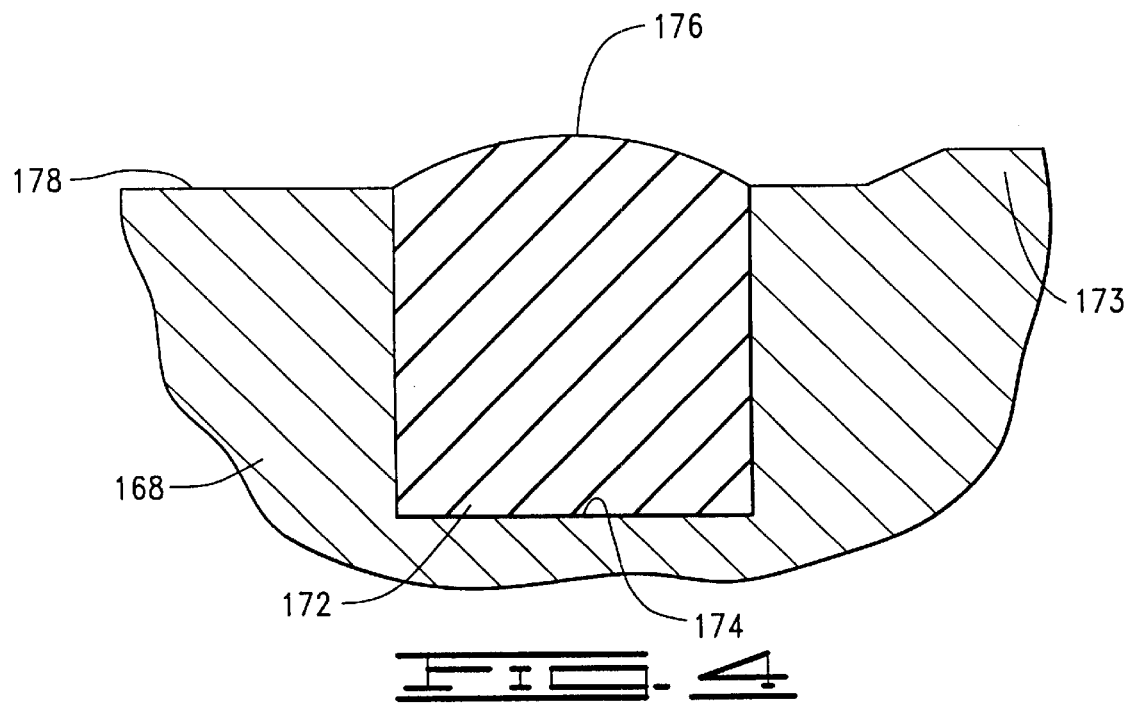
FIG. 4 shows a cross-sectional view of one of the rings of FIG. 3 in an unloaded state.
Figure 5:
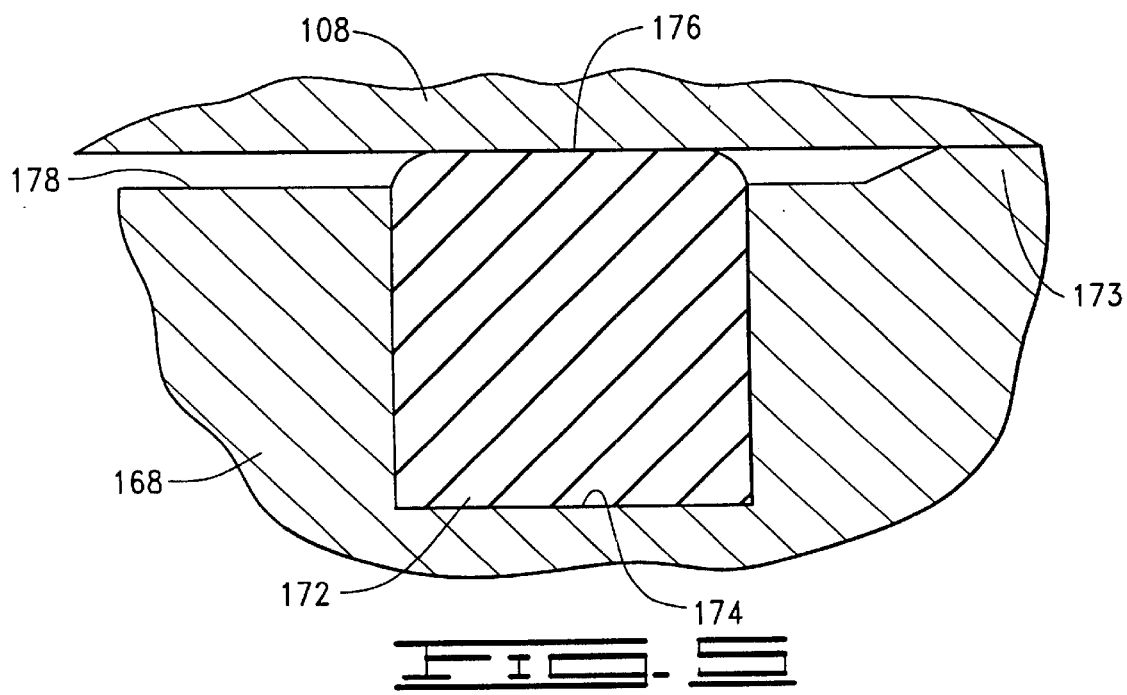
FIG. 5 shows a cross-sectional view of the ring of FIG. 4 in a loaded state.

The ring 172 of FIG. 3 is shown in greater detail in FIGS. 4 and 5. The ring is disposed within a circularly extending recess 174 and can be molded in place or formed separately as an insert which is subsequently installed in the recess. The ring 172 has a curved contact surface 176 that projects beyond a planar surface 178 of the flange 168. When axial clamping force is applied, the ring compresses as shown in FIG. 5, but the contact surface 176 preferably remains beyond the surface 178 so that the clamping force is localized at the contact surface 178 and the node 173 so that a gap is formed between the surface 178 and the disc 108. Localizing the clamping force in this way, instead of allowing the material to compress so that the clamping force is applied along the length of the surface 178, reduces the likelihood of disc coning and warping. It will be understood that the rings in the spacers 166 and clamp 170 have similar configurations as shown in FIGS. 4 and 5. Although FIG. 3 shows the flange 168 and clamp 170 to have two rings 172 and two nodes 173 and each spacer 166 to have four rings 172 and four nodes 173, other respective numbers of rings and nodes can be used as desired. The nodes 173 preferably have the same coefficient of friction as the surface 178 and are formed from the same material as the surface 178 to prevent compression of the nodes 173, thereby establishing the axial locations of the various components (discs, spacers) in the stack. The higher coefficient of friction of the rings 172 prevents disc slip.

Another preferred embodiment is shown in FIG. 6, which shows a disc stack 180 affixed about a spindle motor hub 182 having an outer hub surface 183 and which rotates about a central axis 184. As before, a plurality of discs 108 and spacers 186 are secured between a hub flange 188 and a shrink-fit clamp 190. Rings 192 are affixed to outer circumferentially extending surfaces of each of the spacers 186, flange 188 and clamp 190. Circumferentially extending nodes 193 extend as shown.

A portion of one of the spacers 186 is shown in FIGS. 7 and 8. The ring 192 is molded onto or attached (via adhesive or other means) to an outer surface 194 of the spacer 186. The ring 192 has curved surfaces 196 that project beyond radially extending top and bottom surfaces 198 of the spacer 186, and preferably remain beyond the surfaces 198 when the axial clamping force is applied, so that the clamping force is localized at the nodes 193 and at the rings 192. As before, other numbers of nodes 193 can be used as desired.

In summary, the present invention is directed to an apparatus for improving resistance of a disc drive disc stack to radially directed mechanical shocks. In accordance with a preferred embodiment, a disc drive 100 includes a spindle motor hub 162, 182 which is configured for rotation about a central axis 164, 184 and having a circumferentially extending outer hub surface 163, 183. A disc 108 circumferentially extends about the outer hub surface and has top and bottom disc surfaces each extending along planes substantially normal to the central axis, with the disc having a disc coefficient of friction.

Opposing first and second disc support members (including a clamp 170, 190, spacers 166, 186, or a hub flange 168, 188) circumferentially extend about the outer hub surface and cooperate to apply a clamping force to the disc to secure the disc relative to the spindle motor hub. The first and second disc support members each comprise a radially extending support member surface 178, 198 immediately adjacent the disc along a plane substantially normal to the central axis and a circumferentially extending ring 172, 192 having a contact surface 176, 196 that axially extends from the radially extending support member surface toward the disc. At least one radially extending node 173, 193 also axially extends from the radially extending support member surface 178, 198 in a direction toward the disc 108. Each ring has a coefficient of friction greater than the disc coefficient of friction, and the clamping force applied to the top and bottom disc surfaces is localized at the contact surfaces of the rings and at the nodes so that respective gaps are formed between the top and bottom disc surfaces and the radially extending support member surfaces.

For purposes of the appended claims, the phrase "disc support member" will be understood consistent with the foregoing discussion as an element such as the disclosed hub flange 168, 188, spacers 166, 186, and the clamps 170, 190.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive comprising:

a spindle motor hub rotatable about a central axis and having a circumferentially extending outer hub surface;

a disc circumferentially extending about the outer hub surface and having top and bottom disc surfaces each extending along planes substantially normal to the central axis; and opposing first and second disc support members circumferentially extending about the outer hub surface which cooperate to apply a clamping force to the disc to secure the disc relative to the spindle motor hub, the first and second disc support members each comprising a radially extending support member surface immediately adjacent the disc along a plane substantially normal to the central axis, a radially extending node which is formed from the same material as and which axially extends from the radially extending support member surface toward the disc, and a circumferentially extending ring having a contact surface that axially extends from the radially extending support member surface toward the disc, each ring having a coefficient of friction greater than a coefficient of friction of the node, wherein the clamping force applied to the top and bottom disc surfaces is localized at the contact surfaces of the rings and at the nodes so that respective gaps are formed between the top and bottom disc surfaces and the radially extending support member surfaces, wherein each disc support member comprises a circumferentially extending recess adjacent the respective radially extending support member surface, and wherein each ring is disposed within and extends from the respective recess.

2. The disc drive of claim 1, wherein a selected one of the first and second disc support members comprises a disc clamp affixed to the spindle motor hub.

3. The disc drive of claim 1, wherein a selected one of the first and second disc support members comprises a flange that extends from the hub outer surface.

4. The disc drive of claim 1, wherein the disc is characterized as a first disc, wherein the disc drive further comprises a second disc circumferentially extending about the outer hub surface, and wherein a selected one of the first and second disc support members comprises a disc spacer that establishes a relative axial spacing between the first and second discs.

5. The disc drive of claim 1, wherein each of the rings has a coefficient of friction between about 4.1 and about 15.8.

6. A disc drive comprising:

a spindle motor hub rotatable about a central axis and having a circumferentially extending outer hub surface;

a disc circumferentially extending about the outer hub surface and having top and bottom disc surfaces each extending along planes substantially normal to the central axis; and opposing first and second disc support members circumferentially extending about the outer hub surface which cooperate to apply a clamping force to the disc to secure the disc relative to the spindle motor hub, the first and second disc support members each comprising a radially extending support member surface immediately adjacent the disc along a plane substantially normal to the central axis, a radially extending node which is formed from the same material as and which axially extends from the radially extending support member surface toward the disc, and a circumferentially extending ring having a contact surface that axially extends from the radially extending support member surface toward the disc, each ring having a coefficient of friction greater than a coefficient of friction of the node. wherein the clamping force applied to the top and bottom disc surfaces is localized at the contact surfaces of the rings and at the nodes so that respective gaps are formed between the top and bottom disc surfaces and the radially extending support member surfaces, wherein each disc support member further comprises a circumferentially extending support member outer surface, and wherein the ring is affixed to the circumferentially extending support member outer surface.

7. The disc drive of claim 6, wherein a selected one of the first and second disc support members comprises a disc clamp affixed to the spindle motor hub.

8. The disc drive of claim 6, wherein a selected one of the first and second disc support members comprises a flange that extends from the hub outer surface.

9. The disc drive of claim 6, wherein the disc is characterized as a first disc, wherein the disc drive further comprises a second disc circumferentially extending about the outer hub surface, and wherein a selected one of the first and second disc support members comprises a disc spacer that establishes a relative axial spacing between the first and second discs.

10. The disc drive of claim 6, wherein each of the rings has a coefficient of friction between about 4.1 and about 15.8.

11. A disc drive, comprising:
 a disc;
 a spindle motor having a hub with an outer hub surface; and
 first and second disc support members circumferentially extending about the outer hub surface and disposed on opposing sides of the disc, each of the first and second disc support members comprising:
  two circumferentially extending nodes extending from the respective first and second disc support members toward the disc, each node engaging the disc to clamp the disc to the spindle motor hub; and
  a circumferentially extending ring positioned between the two nodes and having a contact surface that extends from each of the first and second support members toward the disc, wherein the ring engages the disc at the contact surface, and wherein the ring is made from a high friction material to prevent disc slip.

12. The disc drive of claim 11, wherein a selected one of the first and second disc support members comprises a disc clamp affixed to the spindle motor hub.

13. The disc drive of claim 11, wherein a selected one of the first and second disc support members comprises a flange that extends from the hub outer surface.

14. The disc drive of claim 11, wherein the disc is characterized as a first disc, wherein the disc drive further comprises a second disc circumferentially extending about the outer hub surface, and wherein a selected one of the first and second disc support members comprises a disc spacer that establishes a relative axial spacing between the first and second discs.

15. The disc drive of claim 11, wherein each of the rings has a coefficient of friction between about 4.1 and about 15.8.

* * * * *